US010609043B2

(12) United States Patent
Dubrovsky et al.

(10) Patent No.: US 10,609,043 B2
(45) Date of Patent: Mar. 31, 2020

(54) REASSEMBLY-FREE DEEP PACKET INSPECTION ON MULTI-CORE HARDWARE (71) Applicant: SONICWALL US HOLDINGS INC., Milpitas, CA (US)

(72) Inventors: Aleksandr Dubrovsky, San Mateo, CA (US); John E. Gmuender, Sunnyvale, CA (US); Huy Minh Nguyen, Fountain Valley, CA (US); Ilya Minkin, Los Altos, CA (US); Justin M. Brady, San Jose, CA (US); Boris Yanovsky, Saratoga, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

(21) Appl. No.: 16/399,839

(22) Filed: Apr. 30, 2019

(65) Prior Publication Data

US 2019/0260766 A1    Aug. 22, 2019

Related U.S. Application Data (63) Continuation of application No. 14/456,884, filed on Aug. 11, 2014, now Pat. No. 10,277,610, which is a continuation of application No. 12/238,205, filed on Sep. 25, 2008, now Pat. No. 8,813,221.

(51) Int. Cl.
*H04L 29/06* (2006.01)
(52) U.S. Cl.
CPC ................. *H04L 63/1408* (2013.01)
(58) Field of Classification Search
CPC ......... H04L 63/14–1416; H04L 63/145; H04L 45/00; H04L 47/34; G06F 21/00
USPC .................................................... 726/22, 23
See application file for complete search history.

(56) References Cited

U.S. PATENT DOCUMENTS

| 5,796,942 | A | 8/1998 | Esbensen |
| 5,945,933 | A | 8/1999 | Kalkstein |
| 6,088,803 | A | 7/2000 | Tso et al. |
| 6,108,782 | A | 8/2000 | Fletcher et al. |
| 6,119,236 | A | 9/2000 | Shipley |
| 6,178,448 | B1 | 1/2001 | Gray et al. |
| 6,219,706 | B1 | 4/2001 | Fan et al. |
| 6,449,723 | B1 | 9/2002 | Elgressy et al. |

(Continued)

FOREIGN PATENT DOCUMENTS

| EP | 1 222 932 | 8/2001 |
| EP | 1 528 743 | 5/2005 |
| WO | WO 97/39399 | 10/1997 |

OTHER PUBLICATIONS

Aggarwal, N., "Improving the Efficiency of Network Intrusion Detection Systems", Indian Institute of Technology, May 3, 2006, pp. 1-40.

(Continued)

*Primary Examiner* — Brian F Shaw
(74) *Attorney, Agent, or Firm* — Polsinelli LLP (57) ABSTRACT Some embodiments of reassembly-free deep packet inspection (DPD on multicore hardware have been presented. In one embodiment, a set of packets of one or more files is received at a networked device from one or more connections. Each packet is scanned using one of a set of processing cores in the networked device without buffering the one or more files in the networked device. Furthermore, the set of processing cores may scan the packets substantially concurrently.

20 Claims, 7 Drawing Sheets (56) References Cited

U.S. PATENT DOCUMENTS

| | | | |
|---|---|---|---|
| 6,851,061 | B1 | 2/2005 | Holland et al. |
| 7,134,143 | B2 | 11/2006 | Stellenberg et al. |
| 7,185,368 | B2 | 2/2007 | Copeland |
| 7,304,996 | B1 | 12/2007 | Swenson et al. |
| 8,813,221 | B1 | 8/2014 | Dubrovsky et al. |
| 10,277,610 | B2 | 4/2019 | Dubrovsky et al. |
| 2002/0083331 | A1 | 6/2002 | Krumel |
| 2003/0084328 | A1 | 5/2003 | Tarquini et al. |
| 2003/0110208 | A1 | 6/2003 | Wyschogrod et al. |
| 2003/0145228 | A1 | 7/2003 | Suuronen et al. |
| 2004/0093513 | A1 | 5/2004 | Cantrell et al. |
| 2004/0123155 | A1 | 6/2004 | Etoh et al. |
| 2004/0255163 | A1 | 12/2004 | Swimmer et al. |
| 2005/0108518 | A1 | 5/2005 | Pandya |
| 2005/0120243 | A1 | 6/2005 | Palmer et al. |
| 2005/0216770 | A1 | 9/2005 | Rowett et al. |
| 2005/0262556 | A1 | 11/2005 | Waisman et al. |
| 2006/0020595 | A1 | 1/2006 | Norton et al. |
| 2006/0069787 | A1 | 3/2006 | Sinclair |
| 2006/0077979 | A1 | 4/2006 | Dubrovsky et al. |
| 2007/0058551 | A1 | 3/2007 | Brusotti et al. |
| 2009/0285228 | A1 | 11/2009 | Bagepalli et al. |
| 2014/0359764 | A1 | 12/2014 | Dubrovsky et al. |

OTHER PUBLICATIONS

Bellovin, S., "Firewall-Friendly FTP," Network Woring Group, RFC No. 1579, AT&T Bell Laboratories, Feb. 1994, http://www.ietf.org/rfc1579.txt?number=1579, downloaded Jul. 15, 2002, 4 pages.

Blyth, Andrew, "Detecting Intrusion", School of Computing, University of Glamorgan, 14 pages.

Branch, Joel, "Denial of Service Intrusion Detection Using Time Dependent Deterministic Finite Automata", RPI Graduate Research Conference 2002, Oct. 17, 2002, 7 pages.

Juniper Networks, "Attack Prevention," www.juniper.net/products/intrusion/prevention.html, downloaded Jun. 11, 2004, 2 pages.

Juniper Networks, "Attack Detection," www.juniper.net/products/intrusion/detection.html,downloaded Jun. 11, 2004, 7 pages.

Juniper Networks, "Intrusion Detection and Prevention," www.juniper.net/products/intrusion/downloaded Jun. 11, 2004, 2 pages.

Juniper Networks, "Architecture," www.juniper.net/products/intrusion/architecture.html,downloaded Jun. 11, 2004, 3 pages.

Juniper Networks, "Juniper Networks NetScreen—IDP 10/100/500/1000," Intrusion Detection and Prevention, Spec Sheet, Apr. 2004, 2 pages.

Kruegal, Christopher, "Using Decision Trees to Improve Signature-Based Instrusion Detection", Sep. 8, 2003, RAID 2003: recent Advance in Instrusion Detection, 20 pages.

Roberts, Paul, "NetScreen Announces Deep Inspection Firewall," IDG News Service, Oct. 20, 2003, http://www.nwfusion.com/news/2003/1020netscannou.html,downloaded Jun. 11, 2004, 5 pages.

Roesch, Martin and Green, Chris, "Snort Users Manual," Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).

"SonicOS Standard 3.8.0.2 Release Notes, SonicWALL Secure Anti-Virus Router 80 Series," SonicWALL, Inc., Software Release: Apr. 11, 2007, 13 pp.

"SonicWALL Complete Anti-Virus, Automated and Enforced Anti-Virus Protection," © 2005, 2 pp.

SonicWALL Content Filtering Service, Comprehensive Internet Security™, © 2005, 2pp.

"SonicWALL Content Security Manager Series, Easy-to-use, Affordable, Content Security and Internet Threat Protection," © 2006, Dec. 2006, 4 pp.

"SonicWALL Endpoint Security: Anti-Virus, Automated and Enforced Anti-Virus and Anti-Spyware Protection," © 2007, Mar. 2007, 2 pp.

SonicWALL Internet Security Appliances, "Content Security Manager Integratred Solutions Guide", Version 3.0, © 2007, 160 pp.

Snort.org, "The Open Source Network Intrusion Detection System", www.snort.org/about.html, 2 pages.

"The Ultimate Internet Sharing Solution, WinProxy, Usesr Manual," Copyright 1996-2002 Osistis Software, Inc., dated Feb. 2002 (290 pgs).

Van Engelen, R., "Constructing Finite State Automata for High-Performance XML Web Services," International Symposium on Web Services and Applications, 2004, pp. 1-7.

U.S. Appl. No. 12/238,205, Final Office Action dated Dec. 12, 2013.
U.S. Appl. No. 12/238,205, Office Action dated Jul. 10, 2013.
U.S. Appl. No. 12/238,205, Final Office Action dated Aug. 23, 2012.
U.S. Appl. No. 12/238,205, Office Action dated Mar. 13, 2012.
U.S. Appl. No. 14/456,884, Final Office Action dated Sep. 11, 2017.
U.S. Appl. No. 14/456,884, Office Action dated Feb. 28, 2017.
U.S. Appl. No. 14/456,884, Final Office Action dated Oct. 26, 2016.
U.S. Appl. No. 14/456,884, Office Action dated Jul. 6, 2016.
U.S. Appl. No. 14/456,884, Final Office Action dated Feb. 19, 2016.
U.S. Appl. No. 14/456,884, Office Action dated Oct. 29, 2015.

REASSEMBLY-FREE DEEP PACKET INSPECTION ON MULTI-CORE HARDWARE

CROSS-REFERENCE TO RELATED APPLICATIONS

The present application is a continuation and claims the priority benefit of U.S. patent application Ser. No. 14/456,884 filed Aug. 11, 2014, now U.S. Pat. No. 10,277,610, which is a continuation and claims the priority benefit of U.S. patent application Ser. No. 12/238,205 filed Sep. 25, 2008, now U.S. Pat. No. 8,813,221, the disclosures of which are incorporated herein by reference.

TECHNICAL FIELD

The present invention relates to intrusion detection and prevention in a networked system, and more particularly, to performing multiple packet payloads analysis on multicore hardware.

BACKGROUND

Today, in many security products, scanning by pattern matching is used to prevent many types of security attacks. For example, some existing desktop virus scanning may include scanning files against certain recognizable patterns. These files may come from mail attachments or website downloads. These desktop applications are simpler in that by the time the pattern matching is performed, the input has been all accumulated in the correct order. The situation is more complicated for gateway products, such as firewalls, attempting to match patterns for other purposes. Some of these products scan for patterns over Transport Control Protocol (TCP) packets. Since TCP usually breaks down application data into chunks called TCP segments, the full pattern may reside in several TCP segments. One conventional approach is to reassemble all TCP packets together into one large chunk and perform pattern matching on this chunk, similar to scanning files. The disadvantage of this approach is that this approach requires processing to reassemble, and it further requires memory to buffer the intermediate result before pattern matching can take place.

To further complicate the problem, many security attacks exhibit more than one pattern, and thus, multiple pattern matching has to be performed in order to successfully screen out these attacks. Such a collection of patterns is called a signature. For example, an attack signature may contain a recognizable header and a particular phrase in the body. To detect such an attack, the detection mechanism has to match all the patterns in the signature. If only part of the signature is matched, false positives may occur. As such, the term "attack pattern" is used to refer to a single pattern or a signature.

When such attacks are transported over TCP, the contents, and therefore the recognizable patterns, may exist in different TCP segments. In fact, even a single pattern is often split over several segments. Therefore, two problems have to be solved at the same time. On one hand, the detection mechanism has to scan each pattern across multiple segments, and on the other hand, the detection mechanism also has to scan across patterns. One existing approach is to reassemble all packets and scan for each pattern in sequence. This approach is inefficient in terms of processing time and memory usage because scanning cannot start until all packets are received and reassembled and extra memory is needed to store the packets received.

Another problem in pattern matching is that the packets may arrive out of order. Again, using TCP as an example, the application data is broken into what TCP considers the best sized chunks to send, called a TCP segment or a TCP packet. When TCP sends a segment, it maintains a timer and waits for the other end to acknowledge the receipt of the segment. The acknowledgement is commonly called an ACK. If an ACK is not received for a particular segment within a predetermined period of time, the segment is retransmitted. Since the IP layer transmits the TCP segments as IP datagrams and the IP datagrams can arrive out of order, the TCP segments can arrive out of order as well. Currently, one receiver of the TCP segments reassembles the data so that the application layer receives data in the correct order.

An existing Intrusion Detection/Prevention System (IPS) typically resides between the two ends of TCP communication, inspecting the packets as the packets arrive at the IPS. The IPS looks for predetermined patterns in the payloads of the packets. These patterns are typically application layer patterns. For example, the pattern might be to look for the word "windows." However, the word may be broken into two TCP segments, e.g., "win" in one segment and "dows" in another segment. If these two segments arrive in the correct order, then IPS can detect the word. However, if the segments arrive out of order, which happens relatively often, then the IPS may first receive the segment containing "dows", and have to hold this segment and wait for the other segment. A typical approach is for the IPS to force the sender to re-transmit all the segments from the last missing one, hoping that the segments may arrive in order the second time. One disadvantage of this approach is the additional traffic in between and the additional processing on both ends of the TCP communication.

To take advantage of the introduction of multi-core processors (e.g., Intel® Core™2 Quad Processors from Intel Corporation of Santa Clara, Calif.), some conventional ISPs use multi-core processors to scan incoming segments to speed up the process. In general, each multi-core processor has two or more processing cores. According to one conventional approach, one of the processing cores is used to completely reassemble the file while the remaining processing cores perform scanning or pattern matching in the background after the file has been completely reassembled. However, this approach does not scale in terms of having enough memory to store all files. Also, background scanning by multiple processing cores is less efficient due to extra memory copying overhead and extra scheduling processing overhead.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of reassembly-free deep packet inspection on multi-core hardware. In one embodiment, a set of packets of one or more files is received at a networked device from one or more connections. Each packet is scanned using one of a set of processing cores in the networked device without buffering the one or more files in the networked device. Furthermore, the set of processing cores may scan the packets substantially concurrently.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
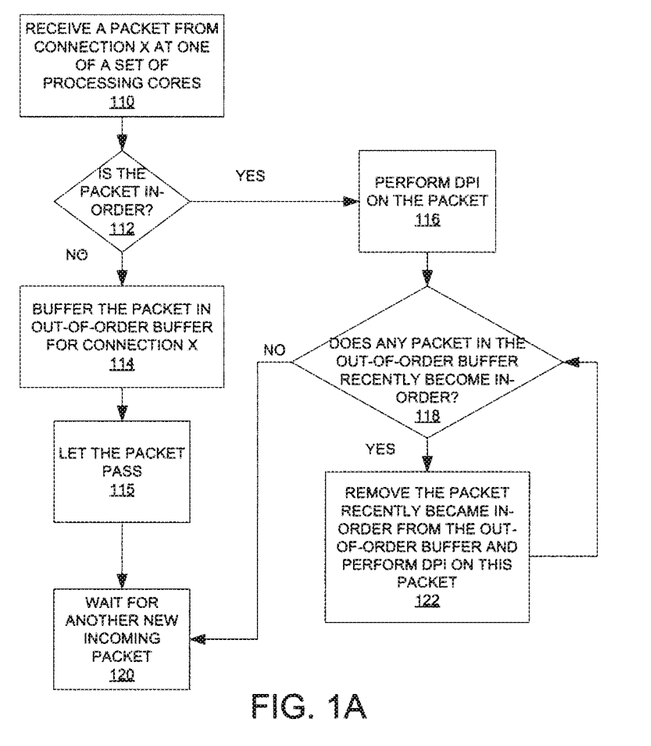
FIG. 1A illustrates one embodiment of a method to perform multiple packet analysis on multi-core hardware.

FIG. 1A illustrates one embodiment of a method to perform multiple packet analysis on multi-core hardware, where multiple processing cores of a set of processing cores are allowed to handle packets from the same connection (hereinafter, "connection X"). In some embodiments, the set of processing cores includes processing cores of a multi-core processor. The method may be performed by processing logic that may comprise hardware (e.g., circuitry, dedicated logic, programmable logic, processing cores, etc.), software (such as instructions run on a processing core), firmware, or a combination thereof.

Initially, one of a set of processing cores receives a packet from connection X (processing block 110). The packet is part of a file, which may be re-constructed by re-assembling the packet with other packets of the file. Then the processing core determines if the packet is in-order (processing block 112). For example, the processing core may check a sequence number in a header of the packet against a next packet sequence number of connection X, which may be stored in a database commonly accessible by the processing cores.

If the packet is not in-order, i.e., out-of-order, then the processing core may buffer the packet in an out-of-order buffer associated with connection X (processing block 114). The processing core may allow the packet to pass (processing block 115). Then the processing core waits for another new incoming packet (processing block 120).

If the packet is in-order, then the processing core performs deep packet inspection (DPI) on the packet (processing block 116). Details of some embodiments of DPI are discussed below. Then the processing core checks if there is any packet in the out-of-order buffer associated with connection X that recently became in-order (processing block 118). If there is no packet in the out-of-order buffer associated with connection X that is next in sequence (in-order), the processing core transitions to processing block 120 to wait for another new incoming packet. Otherwise, if there is a packet in the out-of-order buffer associated with connection X that is now in-order, then the processing core removes this packet and performs DPI on this packet (processing block 122). When the processing core completes DPI on this packet, the processing core returns to processing block 118 to check if there is another packet in the out-of-order buffer associated with connection X that is in-order.

Note that the incoming packets are scanned without buffering the file for reassembly because the packets can be inspected for the predetermined pattern without being reassembled into the file. Thus, the above technique is well suited for IPSs that have limited capacity for buffering or storage. Furthermore, the above technique allows the set of processing cores to scan incoming packets substantially concurrently. Therefore, the speed of the scanning may be improved over conventional approaches.

Figure 1B:
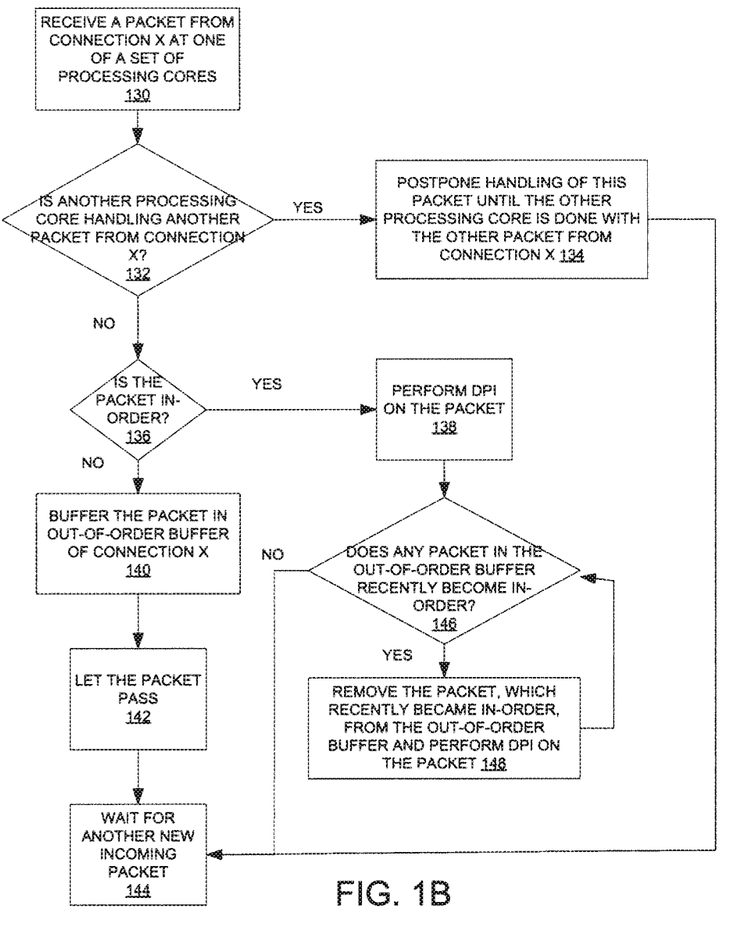
FIG. 1B illustrates an alternate embodiment of a method to perform multiple packet analysis on multi-core hardware.

FIG. 1B illustrates one embodiment of a method to perform multiple payload analysis on multi-core hardware, where only a single core in a set of processing cores is allowed to handle packets from a particular connection (hereinafter, "connection X") at a time. In some embodiments, the set of processing cores includes processing cores of a multi-core processor. The method may be performed by processing logic that may comprise hardware (e.g., circuitry, dedicated logic, programmable logic, processing cores, etc.), software (such as instructions run on a processing core), firmware, or a combination thereof.

Initially, one processing core of the set of processing cores receives a packet from connection X (processing block 130). Then the processing core checks if there is another processing core in the set of processing cores handling another packet from connection X (processing block 132). If there is another processing core handling another packet from connection X currently, then the processing core postpones handling of this packet until the other processing core is done with the other packet from connection X (processing block 134). The processing core may transition to processing block 144 to wait for another new incoming packet.

If the processing core determines that there is no other processing core in the set of processing cores handling another packet from connection X, then the processing core checks if this packet is in-order (processing block 136). If this packet is not in-order, i.e., out-of-order, then the processing core buffers this packet in an out-of-order buffer associated with connection X (processing block 140). The processing core may allow this packet to pass (processing block 142). Then the processing core waits for another new incoming packet (processing block 144). If the processing core determines that this packet is in-order, then the processing core performs DPI on this packet (processing block 138). Details of some embodiments of DPI are discussed below. After performing DPI on the packet, the processing core checks if there is any packet in the out-of-order buffer associated with connection X, which is now in-order (processing block 146). If there is a packet in the out-of-order buffer that is now in-order, then the processing core removes the packet that recently became in-order from the out-of-order buffer and performs DPI on this packet (processing block 148). Then the processing core returns to processing block 146 to repeat the above process. If there is no packet in the out-of-order buffer that is in-order, then the processing core transitions to processing block 144 to wait for another new incoming packet.

Like the technique illustrated in FIG. 1A, the technique illustrated in FIG. 1B also allows scanning of the incoming packets without buffering the file for reassembly because the packets can be scanned for the predetermined pattern, without reassembling the packets into the file, by DPI.

Figure 1C:
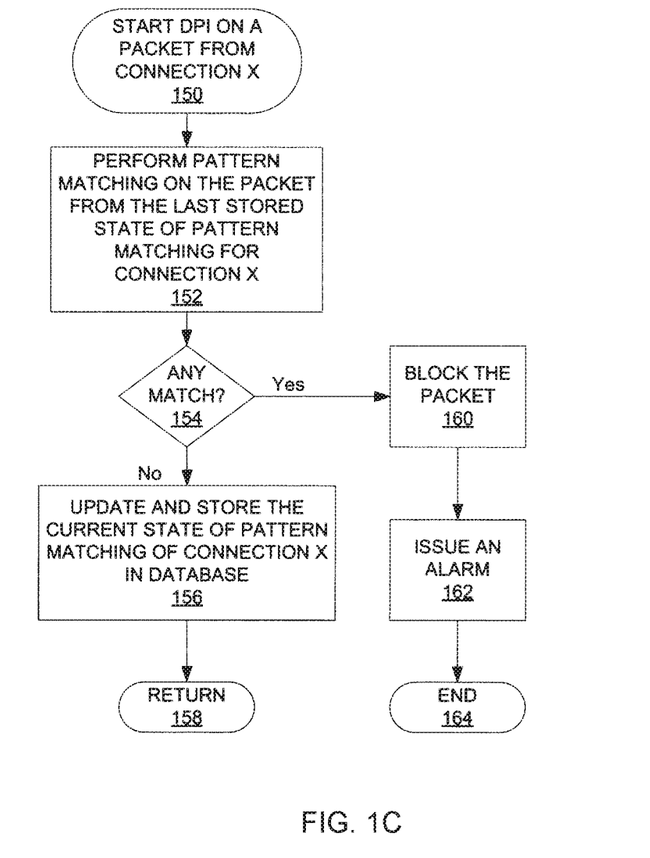
FIG. 1C illustrates one embodiment of a method to perform deep packet inspection.

FIG. 1C illustrates one embodiment of a method to perform deep packet inspection (DPI) using one of a set of processing cores. In some embodiments, the set of processing cores includes processing cores of a multi-core processor. The method may be performed by processing logic that may comprise hardware (e.g., circuitry, dedicated logic, programmable logic, processing cores, etc.), software (such as instructions run on a processing core), firmware, or a combination thereof.

Initially, the processing core starts DPI on a packet from connection X at block 150. This packet is hereinafter referred to as the current packet. The processing core performs pattern matching on the current packet from the last stored state of pattern matching for connection X (processing block 152). Specifically, the processing core is trying to look for a predetermined pattern or signature in the incoming packets, which may be associated with a computer virus or malicious code. By identifying such pattern or signature in the incoming packets and blocking at least one of the packets containing part of the predetermined pattern or signature, the set of processing cores can protect a system from computer viral attack. In some embodiments, the last stored state of pattern matching for connection X is stored in a database commonly accessible by the set of processing cores. As such, each of the set of processing cores can handle packets from connection X, even though some of the packets may be inspected by different processing cores.

In some embodiments, if there is a match between a predetermined pattern and the data pattern in the incoming packets inspected so far (which includes the current packet), then the processing core blocks the current packet (processing block 160). Then the processing core may issue an alarm to warn a system administrator of detection of potentially malicious code or virus in the incoming packets (processing block 162), and the process ends at block 164.

If there is no match between the predetermined pattern and the data pattern in the incoming packets inspected so far, then the processing core may update and store the current state of pattern matching of connection X in the database (processing block 156). The method then ends at block 158.

In some embodiments, pattern matching performed in DPI is accomplished using Deterministic Finite Automaton (DFA). An exemplary DFA is shown in FIG. 2 to illustrate the concept.

Figure 2:
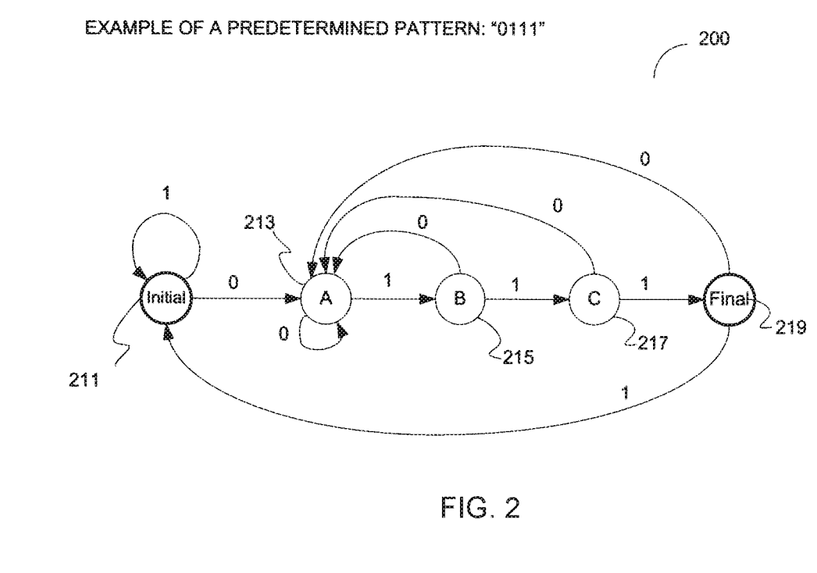
FIG. 2 illustrates an exemplary Deterministic Finite Automaton (DFA) according to one embodiment of the invention.

FIG. 2 illustrates an exemplary DFA according to one embodiment of the invention. In this example, an IPS is programmed to detect and to prevent a pattern of "0111" to pass through. The DFA 200 shown in FIG. 2 corresponds to this pattern. A set of processing cores may use the DFA 200 to perform pattern matching on a number of packets to determine whether the packets contain the pattern "0111". Furthermore, to simplify the illustration, it is assumed in this example that each packet contains only one digit. However, it should be appreciated that the concept is applicable to scenarios where a packet contains more than one digits and/or alphabetic letters.

Referring to FIG. 2, the DFA 200 includes 5 states 211-219. The states 211-219 in the DFA 200 may be referred to as nodes. A processing core in the set of processing cores begins pattern matching at the initial state 211. If a packet received contains a "1", the processing core remains in the initial state 211. If the packet contains a "0", which corresponds to the first digit in the predetermined pattern, the processing core transitions to the A state 213.

If the processing core receives a "0" subsequently, the processing core remains in the A state 213. If the processing core receives a "1", which corresponds to the second digit in the predetermined pattern, then the processing core transitions into the B state 215. From the B state 215, the processing core may transition back to the A state 213 if the next packet received contains a "0". If the next packet received contains a "1", which corresponds to the third digit in the predetermined pattern, then the processing core transitions to the C state 217. However, note that another processing core in the set of processing cores may receive and process the next packet in some embodiments.

From the C state 217, the processing core may transition back to the A state 213 if the next packet received contains a "0". If the next packet received contains a "1", which corresponds to the last digit in the predetermined pattern, then the processing core transitions to the final state 219. When the processing core reaches the final state 219, the processing core knows that the packets received so far contain the predetermined pattern. Hence, the processing core may perform the appropriate operations in response to receiving the predetermined pattern, such as blocking the packet of the predetermined pattern last received and issuing an alarm to alert system administrators. To keep track of which state of the DFA is in currently, the processing core stores the current state of the DFA in a database commonly accessible by the set of processing cores. As such, another processing core may continue pattern matching on the next packet from the current state if the other processing core receives the next packet. Furthermore, the current state of the DFA may be associated with a connection from which the packet is received so that the set of processing cores may inspect packets from multiple connections using the information from the database.

One advantage of using the DFA to perform pattern matching on packets is to eliminate the need to reassemble the packets because the processing cores can walk through the DFA as each packet is received and examined. Because a pattern is typically broken up into a number of segments and each segment is transmitted using a packet, it is necessary to inspect multiple packets in order to identify the pattern. Using the DFA, the processing cores may not have to reassemble the packets in order to find out what the pattern contained in the packets is in order to match the pattern against a predetermined pattern. The processing cores may perform pattern matching on a packet-by-packet basis as each of the packets is received without reassembling the packets by walking through the DFA. If a processing core reaches a final state, there is a match between the pattern contained in the packets received so far and the predetermined pattern. There is no need to store the packets for reassembling the packets. Instead, the processing cores may simply store the current state of the DFA in a database commonly accessible by the processing cores.

The concept described above may be expanded to signature detection. A signature is a collection of multiple patterns. To keep track of which pattern within a signature is being matched, processing logic may use a tree structure, where each node within the tree structure corresponds to a pattern and each pattern is represented using a DFA. Alternatively, a single DFA may represent multiple patterns.

Figure 3:
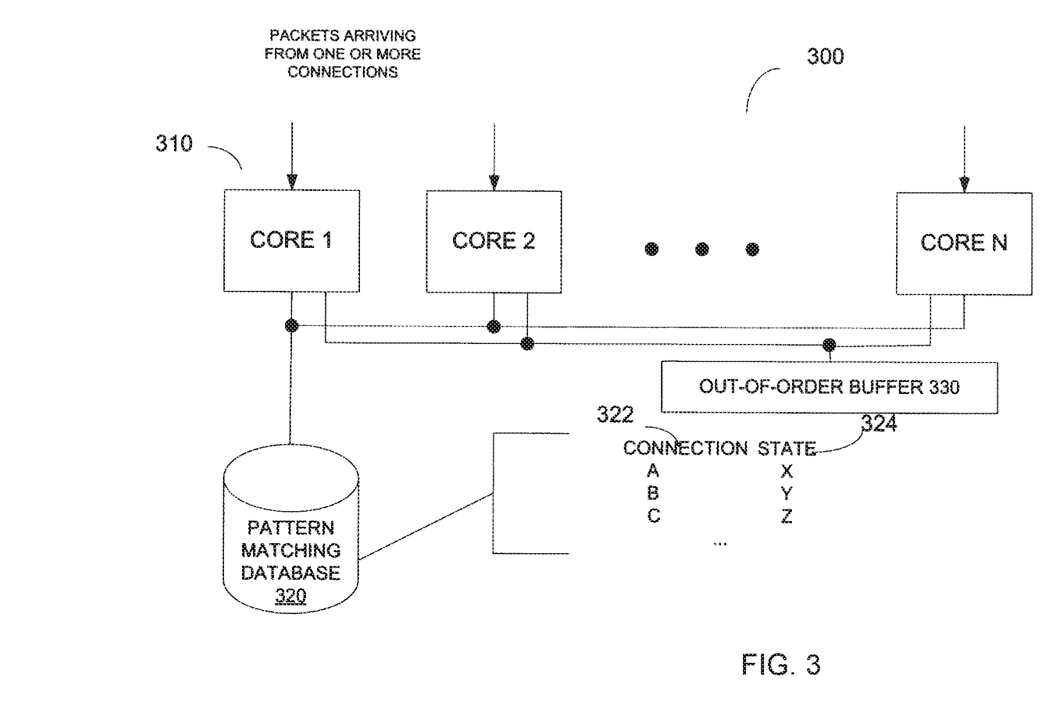
FIG. 3 illustrates a functional block diagram of one embodiment of multi-core hardware usable to perform multiple packet analysis.

FIG. 3 illustrates a functional block diagram of one embodiment of multi-core hardware usable to perform multiple payload analysis in an IPS. The IPS may be implemented within a set-top box coupled to a protected network. The multi-core hardware 300 includes a set of processing cores 310, a pattern matching database 320, and an out-of-order buffer 330. In some embodiments, the set of processing cores 310 includes processing cores in a multi-core processor. The processing cores 310 are communicably coupled to the database 320 so that each of the processing cores 310 may retrieve and update information in the database 320. Likewise, the processing cores 310 are also communicably coupled to the out-of-order buffer 330 so that each of the processing cores 310 may access the out-of-order buffer 330.

In some embodiments, the processing cores 310 receive packets from one or more connections. To prevent harmful virus or malicious code from reaching the protected network, the processing cores 310 performs reassembly-free DPI on the packets. When one of the processing cores 310 receives a packet, the processing core may determine if the packet is in-order or out-of-order. An out-of-order packet may be temporarily stored in the out-of-order buffer 330 and be associated with the connection from which the out-of-order packet is received. In-order packets are examined by the processing cores 310 and are allowed to pass to the protected network if no pattern of harmful virus or malicious code is detected. The processing cores 310 update and store the current pattern matching state of each connection in the database 320. As such, any one of the processing cores 310 can continue with the on-going pattern matching from the current state of a connection that sends the current packet. In some embodiments, the database 320 includes a relational database that stores the current pattern matching states 324 with their corresponding connections 322 as shown in FIG. 2. Details of some embodiments of the method to perform reassembly-free DPI have been discussed above.

Figure 4:
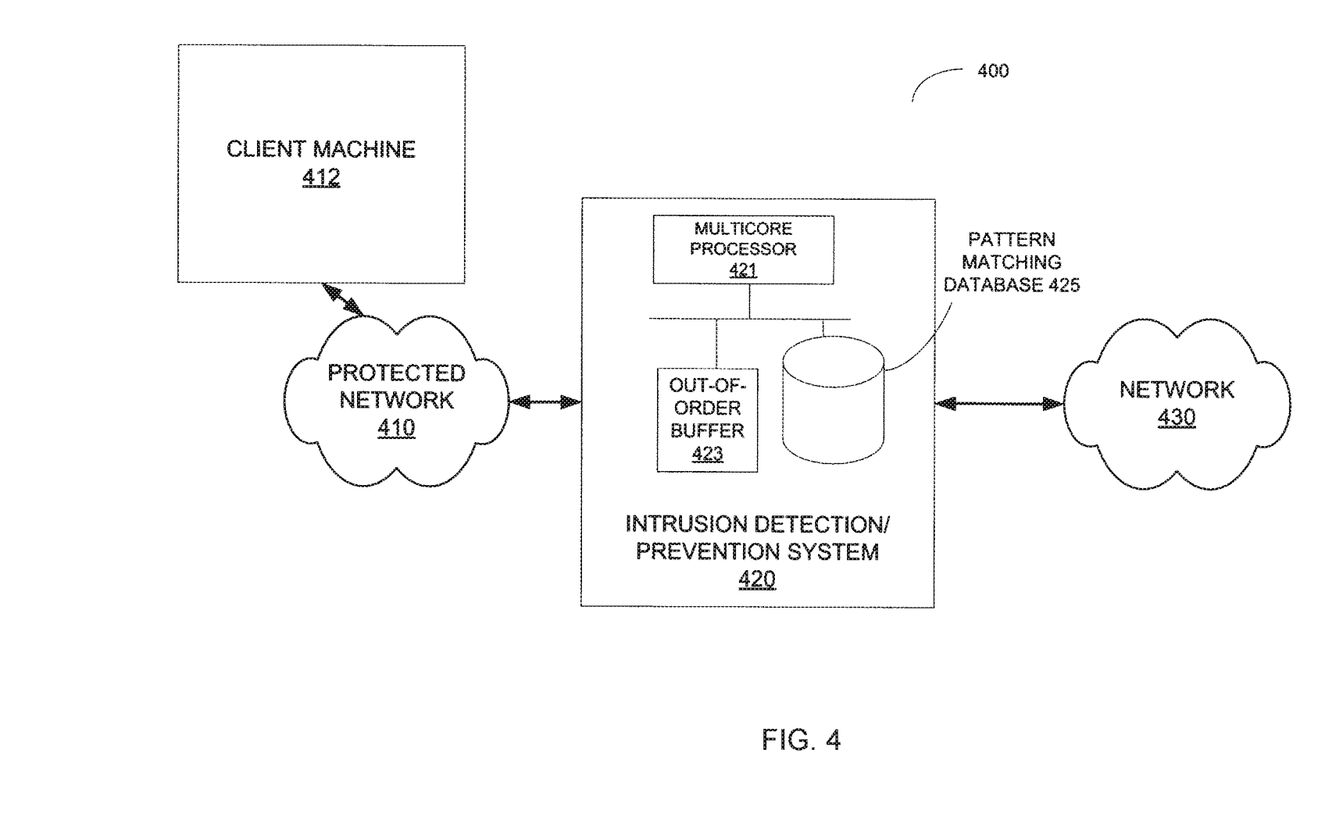
FIG. 4 illustrates one embodiment of a system in which embodiments of the present invention may be implemented.

FIG. 4 illustrates one embodiment of a system in which embodiments of the present invention may be implemented. The system 400 includes a client machine 412 within a protected network 410, an IPS 420, and a network 430. The protected network 410 is communicably coupled to the network 430 via the IPS 420. Thus, packets transmitting between the protected network 410 and the network 430 have to pass through the IPS 420. In some embodiments, there may be more than one client machines coupled to the protected network 410. The network 430 may include a variety of networks, such as local area network (LAN), wide area network (WAN), etc. Furthermore, the network 430 may be publicly accessible, and therefore, computer virus and malicious code targeting the protected network 410 may be sent from the network 430. As such, the IPS 420 scans the incoming packets to prevent computer virus and malicious code from entering the protected network 410.

In some embodiments, the IPS 420 includes a multi-core processor 421, an out-of-order buffer 423, and a pattern matching database 425. The multi-core processor 421 includes a set of processing cores, such as the processing cores 310 shown in FIG. 3.

In some embodiments, each of the processing cores receives packets from the network 430 through different connections. Furthermore, the packets may arrive out-of-order, and if so, the out-of-order packets may be temporarily stored in the out-of-order buffer 423 to be inspected later. The processing cores of the multi-core processor 421 perform DPI on the in-order packets and store the current pattern matching states of the connections in the pattern matching database 425. If a pattern associated with computer virus or malicious code is identified in the incoming packets inspected so far, the multi-core processor 421 blocks the packet currently being inspected and may further issue a warning to a system administrator. If no pattern associated with computer virus or malicious code is identified in the incoming packets inspected so far, then the multi-core processor 421 allows the packet currently being inspected to pass to the protected network 410, which may be further transmitted to the client machine 412. By blocking the packet currently being inspected if the pattern is identified in the packets received so far, the computer virus or malicious code cannot be completely passed into the protected network 410, and hence, the computer virus or malicious code cannot be completely reassembled on the client machine 412. The incomplete computer virus or malicious code typically cannot harm the client machine 412 coupled thereto. Details of some embodiments of a method to perform reassembly-free DPI have been discussed above.

Figure 5:
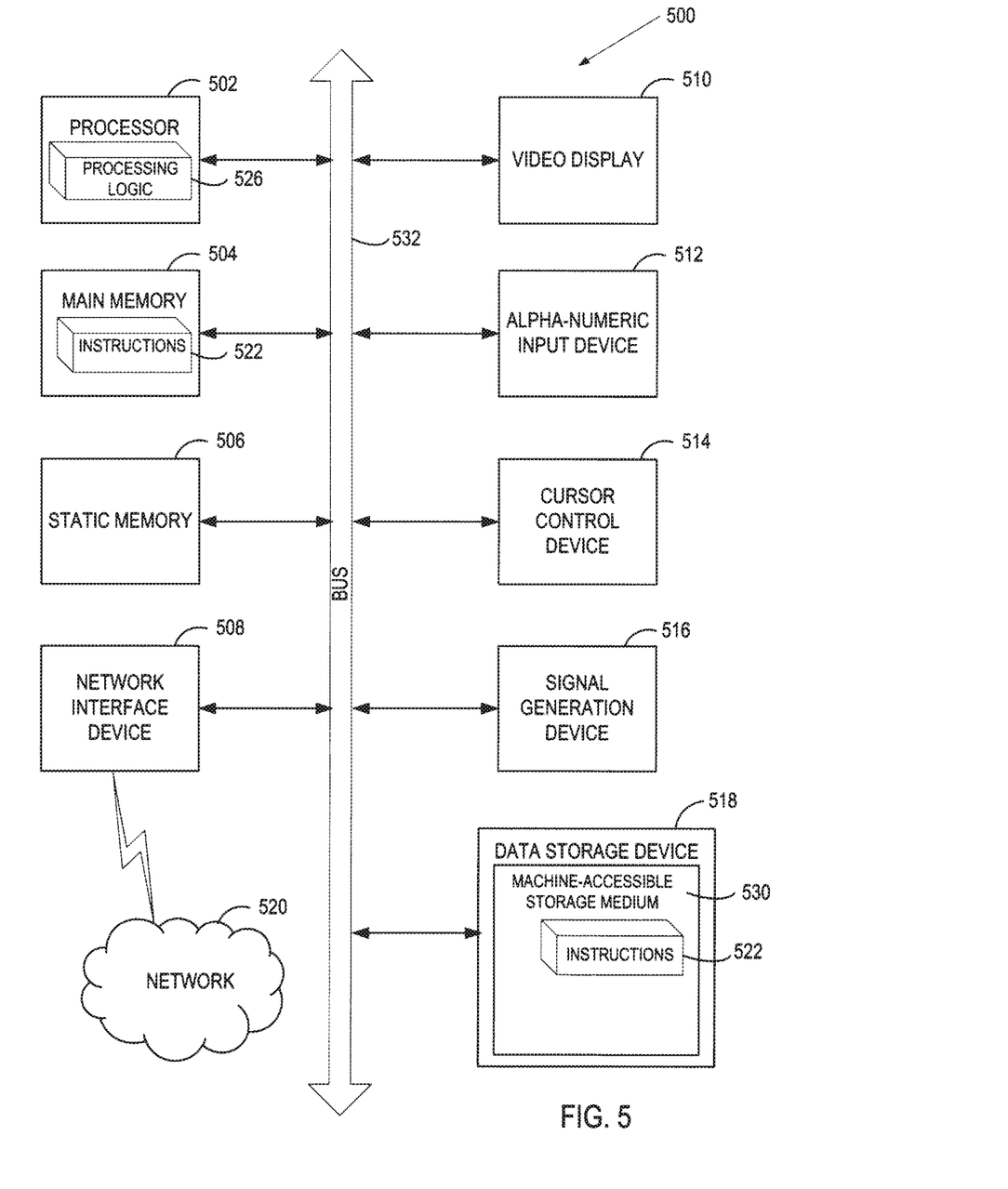
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 532.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 (also known as a machine-readable storage medium or a computer-readable medium) on which is stored one or more sets of instructions (e.g., software 522) embodying any one or more of the methodologies or functions described herein. The software 522 may also reside, completely or at least partially, within the main memory 404 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of reassembly-free DPI on multi-core hardware have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for scanning received data packets, the method comprising:
   storing a first data packet of a first data set in an out-of-order buffer based on an identification by a first processor of a multi-core processor that the first data packet was received out-of-order;
   identifying that a second data packet of the first data set has been received in-order by a second processor of the multi-core processor;
   transmitting the second data packet to a first destination based on a scan of the second data packet indicating that a current status of the first data set does not match a malware pattern;
   scanning the first data packet based on an identification that the first data packet is in-order after the scan of the second data packet, the first data packet scanned by the second processor; and
   blocking the first data packet from being transmitted to the first destination based on the scan of the first data packet indicating that an updated current status of the first data set matches the malware pattern.

2. The method of claim 1, further comprising:
   performing an in-order scan of one or more previously received data packets of the first data set by a plurality of processors of the multi-core processor; and
   sending the previously received data packets to the first destination based on the in-order scan indicating that the current status of the first data set does not match the malware pattern.

3. The method of claim 1, further comprising:
   identifying by the second processor that the second data packet corresponds to a first portion of the malware pattern, wherein the indication that the first data set matches the malware pattern is based on the first data packet corresponding to a second portion of the malware pattern; and
   updating the current status of the first data set based on an in-order scan of the second packet and the first packet, wherein the updated current status matches the malware pattern, wherein the updated current status is made available to other processors of the multi-core processor.

4. The method of claim 1, further comprising:
   transmitting one or more data packets of a second data set to a second destination after the one or more data packets of the second data set are scanned in-order, wherein the first data packet of the first data set is scanned by the second processor at a same time that at least one of the packets of the second data set is being scanned by another processor of the multi-core processor;

scanning a last data packet of the second data set, wherein the last data packet is identified as not matching the malware pattern; and sending the last data packet of the second data set to the second destination.

5. The method of claim 1, further comprising:

identifying by the second processor that the current status of the first data set does not match the malware pattern by comparing the current status of the first data set to the malware pattern and to a second malware pattern; and identifying by the second processor that the updated current status of the first data set matches the malware pattern by comparing the updated current status of the first data set to the malware pattern and to the second malware pattern.

6. The method of claim 1, further comprising:

identifying by the first processor that the first data packet is out-of-order based on a sequence number of the first data packet being out-of-order following a sequence number of a last-scanned data packet of the first data set;

identifying by the second processor that the second data packet is in-order based on a sequence number in the second data packet being in-order following the sequence number of the last-scanned data packet; and scanning the second data packet based on the identification that the second data packet is in-order relative to the last-scanned data packet.

7. The method of claim 1, further comprising:

receiving a third data packet;

storing the third data packet in the out-of-order buffer based on the second data packet preceding the third data packet in a sequential order, wherein the third data packet is stored at the out-of-order buffer at a same time that the first data packet is stored in the out-of-order buffer;

retrieving the third data packet from the out-of-order buffer after scanning the second data packet, wherein the third data packet is immediately after the second data packet in the sequential order; and scanning the third data packet.

8. A non-transitory computer-readable storage medium having embodied thereon a program executable by a processor to perform a method for scanning received data packets, the method comprising:

storing a first data packet of a first data set in an out-of-order buffer based on an identification by a first processor of a multi-core processor that the first data packet was received out-of-order;

identifying that a second data packet of the first data set has been received in-order by a second processor of the multi-core processor;

transmitting the second data packet to a first destination based on a scan of the second data packet indicating that a current status of the first data set does not match a malware pattern;

scanning the first data packet based on an identification that the first data packet is in-order after the scan of the second data packet, the first data packet scanned by the second processor; and blocking the first data packet from being transmitted to the first destination based on the scan of the first data packet indicating that an updated current status of the first data set matches the malware pattern.

9. The non-transitory computer-readable storage of claim 8, further comprising instructions executable to:

perform an in-order scan of one or more previously received data packets of the first data set by a plurality of processors of the multi-core processor; and send the previously received data packets to the first destination based on the in-order scan indicating that the current status of the first data set does not match the malware pattern.

10. The non-transitory computer-readable storage of claim 8, further comprising instructions executable to:

identify by the second processor that the second data packet corresponds to a first portion of the malware pattern, wherein the indication that the first data set matches the malware pattern is based on the first data packet corresponding to a second portion of the malware pattern; and update the current status of the first data set based on an in-order scan of the second packet and the first packet, wherein the updated current status matches the malware pattern, wherein the updated current status is made available to other processors of the multi-core processor.

11. The non-transitory computer-readable storage of claim 8, further comprising instructions executable to:

transmit one or more data packets of a second data set to a second destination after the one or more data packets of the second data set are scanned in-order, wherein the first data packet of the first data set is scanned by the second processor at a same time that at least one of the data packets of the second data set is being scanned by another processor of the multi-core processor;

scan a last data packet of the second data set, wherein the last data packet is identified as not matching the malware pattern; and send the last data packet of the second data set to the second destination.

12. The non-transitory computer-readable storage of claim 8, further comprising instructions executable to:

identify by the second processor that the current status of the first data set does not match the malware pattern by comparing the current status of the first data set to the malware pattern and to a second malware pattern; and identify by the second processor that the updated current status of the first data set matches the malware pattern by comparing the updated current status of the first data set to the malware pattern and to the second malware pattern.

13. The non-transitory computer-readable storage of claim 8, further comprising instructions executable to:

identify by the first processor that the first data packet is out-of-order based on a sequence number of the first data packet being out-of-order following a sequence number of a last-scanned data packet of the first data set;

identify by the second processor that the second data packet is in-order based on a sequence number in the second data packet being in-order following the sequence number of the last-scanned data packet; and scan the second data packet based on the identification that the second data packet is in-order relative to the last-scanned data packet.

14. The non-transitory computer-readable storage of claim 8, the program further executable to:

receive a third data packet;

store the third data packet in the out-of-order buffer based on the second data packet preceding the third data packet in a sequential order, wherein the third data packet is stored at the out-of-order buffer at a same time that the first data packet is stored in the out-of-order buffer;

retrieve the third data packet from the out-of-order buffer after scanning the second data packet, wherein the third data packet is immediately after the second data packet in the sequential order; and scan the third data packet.

15. An apparatus for scanning received data packets, the apparatus comprising:

a multi-core processor that includes a plurality of processors, wherein the plurality of processor includes a first processor that identifies that a first data packet of a first data set was received out-of-order, a memory that includes an out-of-order buffer that stores the first data packet based on the identification by the first processor;

a second processor of the multi-core processor that identifies that a second data packet of the first data set has been received in-order by the second processor of the multi-core processor; and a communication interface that transmits the second data packet to a first destination based on a scan of the second data packet indicating that a current status of the first data set does not match a malware pattern, wherein the second processor scans the first data packet based on an identification that the first data packet is in-order after the scan of the second data packet and blocks the first data packet from being transmitted to the first destination based on the scan of the first data packet indicating that an updated current status of the first data set matches the malware pattern.

16. The apparatus of claim 15, wherein the plurality of processors of the multi-core processor has performed in-order scans of one or more previously received data packets of the first data set, and wherein the previously received data packets were sent to the first destination based on the in-order scans indicating that the current status of the first data set does not match the malware pattern.

17. The apparatus of claim 15, wherein the second processor:

identifies that the second data packet corresponds to a first portion of the malware pattern and the indication that the first data set matches the malware pattern is based on the first data packet corresponding to a second portion of the malware pattern; and updates the current status of the first data set based on an in-order scan of the second packet and the first packet, wherein the updated current status matches the malware pattern, wherein the updated current status is made available to other processors of the multi-core processor.

18. The apparatus of claim 15, wherein the plurality of processors of the multi-core processor has allowed one or more data packets of a second data set to be transmitted to a second destination after the one or more data packets of the second data set are scanned in-order, the first data packet of the first data set scanned by the second processor at a same time that at least one of the data packets of the second data set is being scanned by another processor of the multi-core processor, and wherein one of the processors scans a last data packet of the second data set, the last data packet being identified as not matching the malware pattern and sent to the second destination.

19. The apparatus of claim 15, wherein the second processor further:

identifies that the current status of the first data set does not match the malware pattern by comparing the current status of the first data set to the malware pattern and to a second malware pattern, and identifies that the updated current status of the first data set matches the malware pattern by comparing the updated current status of the first data set to the malware pattern and to the second malware pattern.

20. The apparatus of claim 15, wherein:

the first processor identifies that the first data packet is out-of-order based on a sequence number of the first data packet being out-of-order following a sequence number of a last-scanned data packet of the first data set, the second processor identifies that the second data packet is in-order based on a sequence number in the second data packet being in-order following the sequence number of the last-scanned data packet, and the second data packet is scanned based on the identification that the second data packet is in-order relative to the last-scanned data packet.

* * * * *